United States Patent [19]
Toba et al.

[11] Patent Number: 5,371,582
[45] Date of Patent: Dec. 6, 1994

[54] THICKNESS/DEPTH MEASURING APPARATUS AND METHOD FOR MEASURING THE THICKNESS OF A FILM AND THE DEPTH OF A GROOVE

[75] Inventors: Tamaki Toba; Atsuko Ohkawa; Yasuo Hira, all of Yokohama; Masayasu Fujisawa, Ninomiya; Isao Hashimoto, Hitachi, all of Japan

[73] Assignee: Hitachi, Ltd., Tokyo, Japan

[21] Appl. No.: 99,450

[22] Filed: Jul. 30, 1993

[30] Foreign Application Priority Data

Jul. 31, 1992 [JP] Japan .................................. 4-205120
Nov. 16, 1992 [JP] Japan .................................. 4-305385

[51] Int. Cl.$^5$ .......................... G01B 11/06; G01B 11/22
[52] U.S. Cl. ..................... 356/73; 356/378; 356/382
[58] Field of Search ............... 356/73, 355, 369, 378, 356/381, 382, 445

[56] References Cited

U.S. PATENT DOCUMENTS

| | | | |
|---|---|---|---|
| 4,087,121 | 2/1992 | Kakuchi et al. | 356/73 |
| 4,236,823 | 12/1980 | Roach et al. | 356/378 |
| 4,615,620 | 10/1986 | Noguchi et al. | 356/355 |
| 4,927,485 | 5/1990 | Cheng et al. | 356/355 |
| 5,209,813 | 11/1993 | Oshida et al. | 356/382 |

FOREIGN PATENT DOCUMENTS

1-145504  6/1989  Japan .
1-292202  11/1989  Japan .

*Primary Examiner*—Richard A. Rosenberger
*Attorney, Agent, or Firm*—Antonelli, Terry, Stout & Kraus

[57] ABSTRACT

A thickness/depth measuring apparatus and method for measuring the thickness of a film forming a lattice-shaped mask and the depth of a groove formed on a workpiece during processing of the workpiece. The thickness/depth measuring apparatus and method provide for irradiating the workpiece with a coherent light beam, controlling the direction for linear polarization of the coherent light beam irradiated onto the workpiece, adjusting the incident angle of the coherent light beam irradiated onto the workpiece in a predetermined angular range, receiving and detecting reflected light reflected by the workpiece at different irradiated incident angles and including higher-order diffracted light; and calculating the thickness of the film and the depth of the groove in accordance with the intensity of the diffracted light detected.

15 Claims, 4 Drawing Sheets

THICKNESS/DEPTH MEASURING APPARATUS AND METHOD FOR MEASURING THE THICKNESS OF A FILM AND THE DEPTH OF A GROOVE

BACKGROUND OF THE INVENTION

The present invention relates to a thickness/depth measuring apparatus and method for accurate measurement of the depth of a film forming a mask and a groove or a workpiece during processing of the workpiece when forming the groove by a dry etching process so as to form a semiconductor device such as a storage device, an optical device such as a grating, or a magnetic device such as a magnetic head.

A depth measuring apparatus for measuring the depth of a groove is disclosed in Japanese Patent Application Laid-open No. 1-292202. This known depth measuring apparatus measures the depth of a pit on a stamping glass plate by irradiating the stamping glass plate with coherent light, detecting a plurality of reflected, diffracted light beams reflected by the surface of the stamping glass plate and calculating the ratio between the intensities of the reflected, diffracted light beams.

A thickness/depth measuring apparatus disclosed in Japanese Patent Application Laid-open No. 1-145504 measures the thickness of a film formed on a workpiece and the depth of a groove formed in the surface of the workpiece on the basis of the periods of variation of spectral intensities of regularly reflected light and scattered light obtained by irradiating the workpiece with light beams in a broad band and measuring the spectral intensities of the regularly reflected light and the scattered light.

The known depth measuring apparatus is able to measure the depth of a groove formed in the surface of a workpiece which is not provided with a processing mask of a resist film or the like, such as a stamping glass plate. However, the known depth measuring apparatus is in unable to measure the depth of the groove when the groove is formed on a workpiece coated with a resist film or the like, such as a workpiece for a semiconductor device or an optical device, due to the interferential effect of the resist film. Since the incident angle of the light beam in this known depth measuring apparatus is fixed, the depth measuring apparatus is unable to measure the depth of the groove with high accuracy even if the workpiece is not coated with a processing mask. That is, the known thickness/depth measuring apparatus is incapable of separately measuring the thickness of the film and the depth of the groove on the basis of the periods of variation of the spectral intensities because the respective periods of variation of the spectral intensities of the regularly reflected light and scattered light are approximately equal to each other when the optical path difference attributable to the thickness of the film and the optical difference attributable to the depth of the groove are approximately equal to each other.

SUMMARY OF THE INVENTION

Accordingly, it is an object of the present invention to provide a thickness/depth measuring apparatus and method capable of measuring the thickness of a resist film formed as a mask on a workpiece and the depth of a groove with high accuracy.

Another object of the present invention is to provide a thickness/depth measuring apparatus and method capable of measuring the thickness of a film formed as a mask on a workpiece and the depth of a groove formed in the workpiece even when the measurement of thickness of the film and the depth of the groove through the measurement of the respective periods of variation of the spectral intensities is difficult because the thickness of the film and the depth of the groove are approximately equal to each other.

A thickness/depth measuring apparatus and method according to the present invention is capable of measuring the thickness of a film formed over the surface of a workpiece and the depth of a groove formed in the surface of the workpiece with high accuracy by projecting coherent light beams onto the surface of a workpiece during processing of the workpiece at a desired angle in an angular range including the Brewster angle of the material forming the workpiece, measuring the intensities and diffraction angles of the zero-order reflected, diffracted light beam and the higher-order reflected, diffracted light beam, and determining the thickness of the film and the depth of the groove through the comparison of the measured intensities and diffraction angles with previously determined data representing the relation between the intensities of the reflected, diffracted light beams, the diffraction angles, the thickness of the film and the depth of the groove by an arithmetic unit, even if the workpiece is coated with a film, such as a resist film serving as a mask.

The thickness/depth measuring apparatus according to a feature of the present invention is capable of measuring the thickness of a film formed as a mask over the surface of a workpiece and the depth of a groove formed in the surface of the workpiece with high accuracy even if the thickness of the film and the depth of the groove are approximately equal to each other.

These and other objects, features, and advantages of the present invention will become more apparent from the following description when taken in conjunction with the accompanying drawings which show, for purposes of illustration only, several embodiments of the present invention.

DESCRIPTION OF PREFERRED EMBODIMENTS

Figure 1:
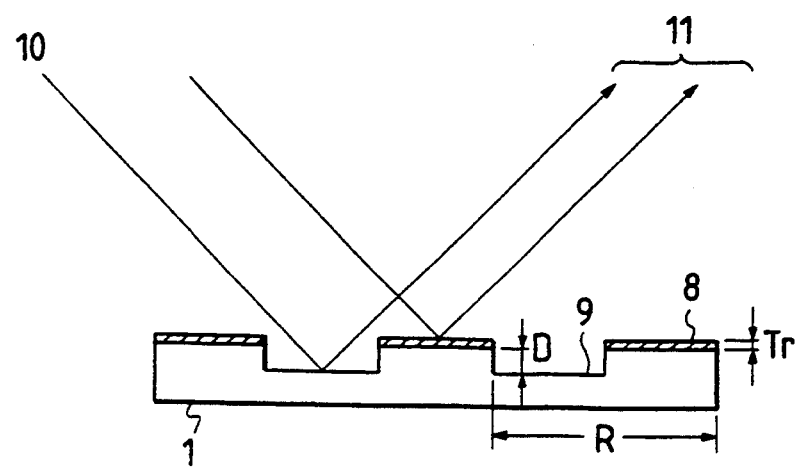
FIG. 1 shows the mode of reflection of a coherent light beam falling on a workpiece at a nonspecific incident angle.

Referring now to the drawings, wherein like reference numerals are utilized to designate like parts throughout the views, FIG. 1 shows the mode of reflection of a coherent light beam incident on a substrate or workpiece at a nonspecific incident angle. More particularly, when a coherent light beam 10 falls obliquely on a groove 9 among those formed at a pitch R at a depth D in the surface of a workpiece 1 coated with a resist film 8 of a thickness Tr, reflected, diffracted light 11 of an intensity dependent on the thickness of the resist film and the depth of the groove is produced.

When the intensity of the reflected, diffracted light 11 is measured while the groove is being formed, it is found that the interference period of the reflected, diffracted light 11, namely, the sum of the reflected light reflected by the resist film 8 and the reflected light reflected by the groove 9, varies irregularly due to the difference between the interference period of the reflected light reflected by the resist film 8 and that of the reflected light reflected by the groove 9. Accordingly, it is impossible, in general, to determine the thickness of the resist film or the depth of the groove on the basis of the reflected, diffracted light.

Figure 2:
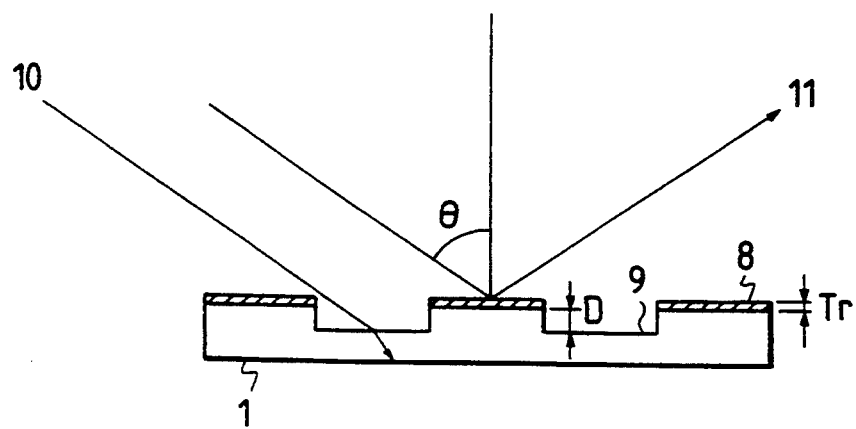
FIG. 2 shows the mode of reflection of a coherent light beam falling on a workpiece at an incident angle equal to the Brewster angle of the workpiece.

However, if a p-polarized light beam having a direction of polarization parallel to the plane of incidence falls on the surface of the workpiece 1 at a Brewster angle $\theta$ as shown in FIG. 2, substantially no light is reflected by the processed portion of the workpiece 1, and hence the interference period of the reflected, diffracted light 11 depends only on the thickness Tr of the resist film. The Brewster angle $\theta = \tan^{-1} n_2/n_1$, where $n_2$ is the refractive index of the workpiece or substrate, and $n_1$ is the refractive index of air. Accordingly, the thickness Tr of the resist film can be determined by measuring the period of repetition of the intensity of the reflected, diffracted light.

Further, an s-polarized light beam is projected on the workpiece 1 and the incident angle of the s-polarized light beam is adjusted to an adjusted incident angle at which the intensity of the diffracted light reaches a maximum or a minimum. The adjusted incident angle is uniquely dependent on the total depth, i.e., the sum of the thickness of the resist film and the depth of the groove, and therefore, the depth of the groove can be determined by subtracting the thickness of the resist film from the total depth.

Figure 3:
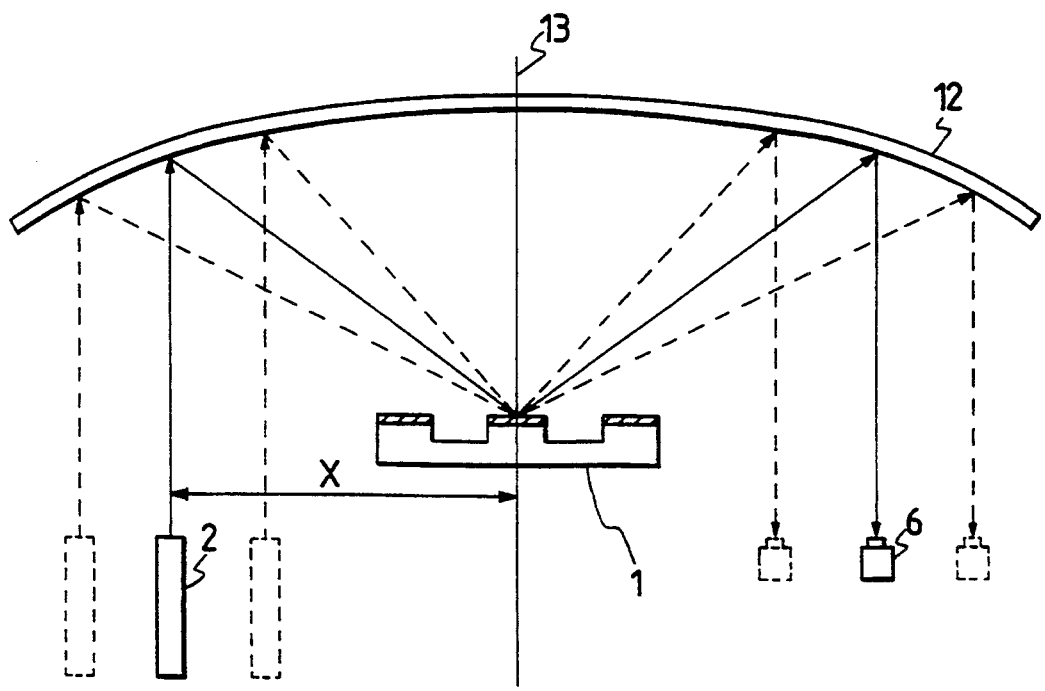
FIG. 3 shows an incident angle varying mechanism for use in the present invention.

FIG. 3 shows a thickness/depth measuring apparatus for measuring the thickness of the resist film and the depth of the groove in the foregoing manner. When a parabolic mirror 12 is disposed so that its focal point is positioned on the workpiece 1, all of the light beams traveling in parallel to the optical axis of the parabolic mirror 12 and falling on the parabolic mirror 12 are focused on the focal point of the parabolic mirror 12. When a light emitting element 2 is disposed at a distance X from the optical axis of the parabolic mirror 12 and emits a light beam in parallel to the optical axis, the incident angle of the light beam emitted by the light emitting element 2 and reflected by the parabolic mirror 12 on the workpiece 1 is expressed by an expression (1). Accordingly, the incident angle of the light beam on the workpiece 1 can be varied by moving the light emitting element 2 along an axis perpendicular to the optical axis of the parabolic mirror 12 to vary the point of incidence of the light beam on the parabolic mirror 12. A detector 6 can also be positioned for detecting reflected light.

$$\theta = \cos^{-1}\left(\frac{X}{\sqrt{4f^2 + X^2}}\right) \quad (1)$$

In the expression (1) f denotes the focal length of the parabolic mirror.

For carrying out the present invention, it is necessary to determine data representing the relation between the thickness of a film and the depth of a groove beforehand through the calculation of the diffraction efficiency of a lattice pattern formed on a workpiece having an optional film thickness and a groove depth and to compare the measured diffraction efficiency with the data. The diffraction efficiency is calculated by a space harmonic expansion. A procedure of calculating the diffraction efficiency by the space harmonic expansion as will be described hereinafter.

Figure 4:
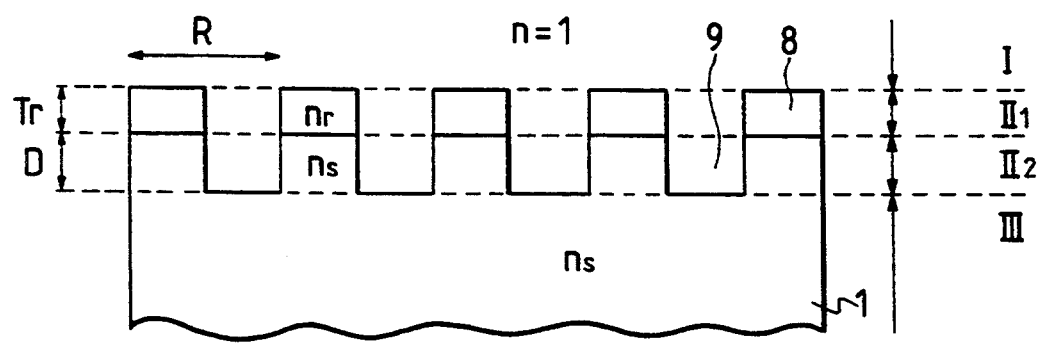
FIG. 4 shows a model of diffraction efficiency calculation.

Assuming that a lattice is formed on a workpiece 1 as shown in FIG. 4, a measuring light beam falls on the workpiece in a region I. The region I is a vacuum layer, and a region III is the workpiece. A region II$_1$ is a masking film having a refractive index of nr. A region II$_2$ includes an alternate arrangement of lattice elements of the workpiece having a refractive index of ns, arranged at a period of R, and vacuum spaces having a refractive index of 1.

When an s-polarized light beam having a plane of polarization perpendicular to the paper falls on the region II, the electric field distribution E (Ey, Ez) of the incident light in the region II meets expressions (2) to (5). The dielectric constants (squares of the refractive indices) of the regions II$_1$ and II$_2$ are expressed by a Fourier series. In the expression (2), k$_o$ is the frequency of the incident light in vacuum equal to $2\pi/\lambda$.

$$\frac{d^2}{dy^2} E(y) + k_o^2 \epsilon(y) E(y) = -\gamma^2 E(y) \quad (2)$$

$$\frac{d^2}{dZ^2} E(z) = \gamma^2 E(z) \quad (3)$$

$$\epsilon(y) = \sum_{l=-\infty}^{\infty} al \exp\left(2\pi j \frac{l}{R} y\right) \quad (4)$$

$$al = \frac{1}{2}(\eta r^2 + 1) \ldots \text{Area } II_1 \quad (5)$$

$$al = \frac{1}{2}(\eta s^2 + 1) \ldots \text{Area } II_2$$

The solution of the expression (1) can be expressed by an expression (6), i.e., a periodic function of an integral multiple of the lattice period R, on the basis of Bloch's theorem.

$$E(y) = \sum_{l=-\infty}^{\infty} Vl \exp\left\{2\pi j \left(\xi + \frac{l}{R}\right) y\right\} \quad (6)$$

An expression (7), i.e., an eigenvalue formula, can be obtained by substituting the expression (6) into the expression (1) and comparing the function of $\exp\{2\pi j(1/R)y\}$.

Solutions $\gamma m2$ and $Vm$ can be obtained by limiting the dimensions of the matrices D and V of the expression (7). The distribution of electric fields and magnetic fields in the regions II$_1$ and II$_2$ can be expressed by expressions (8) to (11) by limiting the dimensions to $2L+1$.

Matrices as element:

$$\overline{D}\,\overline{V} = \gamma^2 \overline{V} \quad (7)$$

$$\overline{D}: dem = \begin{cases} 4\pi^2\left(\xi + \frac{l}{R}\right) - k_o^2 a_o & (l = m) \\ -k_o^2 a \pm i & (l = m \pm i) \end{cases}$$

Vector as element:
$V: Vm$ $$E_{II1} = \sum_{m=-L}^{L}\left[ \{Am^+ e^{-\gamma mZ} + Am^- e^{\gamma mZ}\} \times \right. \quad (8)$$

$$\left. \sum_{m=-L}^{L} Vlm \exp\left\{ 2\pi j\left(\epsilon + \frac{l}{R}\right)y \right\} \right]$$

$$H_{II1} = -j\frac{1}{w\mu o}\frac{\partial}{\partial Z} E_{II1} \quad (9)$$

$$E_{II2} = \sum_{m=-L}^{L}\left[ \{Am'^+ e^{-\gamma' mZ} + Am'^- e^{\gamma' mZ}\} \times \right. \quad (10)$$

$$\left. \sum_{m=-L}^{L} V'm \exp\left\{ 2\pi j\left(\xi + \frac{l}{R}\right)y \right\} \right]$$

$$H_{II2} = -j\frac{1}{w\mu o}\cdot\frac{\partial}{\partial Z} E_{II2} \quad (11)$$

In the expressions, c is the speed of light in a vacuum, and $\omega = k_o c$.

Electromagnetic field distributions in the regions I and III are represented by expressions (12) to (15).

$$E_I = Io + \sum_{l=-L}^{L} Rl \quad (12)$$

where, $$Io = \psi_{0I}^+ e^{2\pi j\xi y} e^{-jW_{0I}Z}$$

$$Rl = \psi^-{}_{l1} e^{2\pi j(\xi + \frac{l}{R})y} e^{jW_{l1}Z}$$

$$W_{l1} = k_o\sqrt{1 - \lambda^2\left(\xi + \frac{l}{R}\right)^2} \quad (13)$$

$$H_I = -j\frac{1}{w\mu o}\frac{\partial}{\partial Z} E_I$$

$$E_{III} = \sum_{l=-L}^{L} Tl \quad (14)$$

where, $$Tl = \psi_{lIII} e^{2\pi j(\xi + \frac{l}{R})y} e^{-jW_{l111}(Z-Tr-D)}$$

$$W_{lIII} = k_o\sqrt{\eta_s{}^2 - \lambda^2\left(\xi + \frac{l}{R}\right)^2}$$

$$H_{III} = -j\frac{1}{w\mu o}\frac{\partial}{\partial Z} E_{III} \quad (15)$$

Using a boundary condition (continuity of E and H) for $Z=0$, $Z=Tr$ and $Z=Tr+D$, expressions (16) to (19) are obtained.

Column vector as element:

$$\begin{pmatrix} \overline{B^+} & \overline{B^-} & \overline{O} & \overline{O} \\ \overline{D^+} & \overline{D^-} & \overline{D'^+} & \overline{D'^-} \\ \overline{E^+} & \overline{E^-} & \overline{E'^+} & \overline{E'^-} \\ \overline{O} & \overline{O} & \overline{C^+} & \overline{C^-} \end{pmatrix} \begin{pmatrix} \overline{A^+} \\ \overline{A^-} \\ \overline{A'^+} \\ \overline{A'^-} \end{pmatrix} = \begin{pmatrix} \overline{R} \\ \overline{O} \\ \overline{O} \\ \overline{O} \end{pmatrix} \quad (16)$$

$\overline{A^+}, \overline{A^-}, \overline{A'^+}, \overline{A'^-}; Am^+, Am^-, Am'^+, Am'^-$ Column vector as element:

$$\overline{R}; Rl = \begin{cases} 2W_{0I}\psi_{0I}^+ & (l = 0) \\ 0 & (l = 0) \end{cases}$$

$\overline{B^+}\,\overline{B^-}\,\overline{C^+}\,\overline{C^-};$ (17)
Square matrices as element of following:
$\overline{B^+}; blm^+ = (Wl_I - jym)\, Vlm$
$\overline{B^-}; blm^- = (Wl_I + jym)\, Vlm$
$\overline{C^+}; Clm^- = (Wl_{III} + jym')\, Vlm'\, e^{-\gamma m'(Tr+D)}$
$\overline{C^-}; Clm^- = (Wl_{III} - jym')\, Vlm'\, e^{\gamma m'(Tr+D)}$ $\overline{D^+}\,\overline{D^-}\,\overline{D'^+}\,\overline{D'^-};$ (18)
Square matrices as elemnt of following:
$\overline{D^+}; dlm^+ = Vlm\, e^{-\gamma mTr}$
$\overline{D^-}; dlm^- = Vlm\, e^{\gamma mTr}$
$\overline{D'^+}; dlm'^- = Vlm'\, e^{-\gamma m'Tr}$
$\overline{D'^-}; dlm'^- = -Vlm'\, e^{\gamma m'Tr}$ $\overline{E^+}\,\overline{E^-}\,\overline{E'^+}\,\overline{E'^-};$ (19)
Square matrices as element of following:
$\overline{E^+}; elm^+ = \gamma m\, Vlm\, e^{-\gamma mTr}$
$\overline{E^-}; elm^- = -\gamma m\, Vlm\, e^{\gamma mTr}$
$\overline{E'^+}; elm'^+ = -\gamma m'\, Vlm'\, e^{-\gamma m'Tr}$
$\overline{E'^-}; elm'^- = \gamma m'\, Vlm'\, e^{\gamma m'Tr}$ Coefficients $Am+$, $Am-$, $Am'+$ and $Am'-$, the expressions (8) and (10) are determined by solving simultaneous equations for the expressions (16) to (19). From the continuity of E when $Z=0$ and $Z=Tr+D$, an expression (20) is obtained.

$$\psi l_I = \begin{cases} \sum_{m=-L}^{L}(Am^+ + Am^-)\, Vlm - \psi lI^+ & (l = 0) \\ \sum_{m=-L}^{L}(Am^+ + Am^-)\, Vlm & (l = 0) \end{cases} \quad (20)$$

Thus, the amplitude of the reflected, diffracted light is determined. Since reflection diffraction efficiency E is the ratio between the energy density per unit area of the incident light and that of the reflected light, the diffraction efficiency of each order of diffraction can be represented by an expression (21).

$$\eta l = \frac{Re(Wl_I)|\psi l_I^-|^2}{Re(W_{0I})|\psi_{0I}^+|^2} \quad (21)$$

The diffraction efficiency for p-polarized light having a plane of polarization perpendicular to that of the s-polarized light, namely, a plane parallel to the paper, can be determined through a similar calculation.

A thickness/depth measuring apparatus in a preferred embodiment according to the present invention using the calculated thickness of the masking film or the relation between the depth of the groove and the diffraction efficiency will be described hereinafter. Although the following examples detect zero-order diffracted light, the present invention is also able to use optional higher-order diffracted light.

EXAMPLE 1

Figure 5:
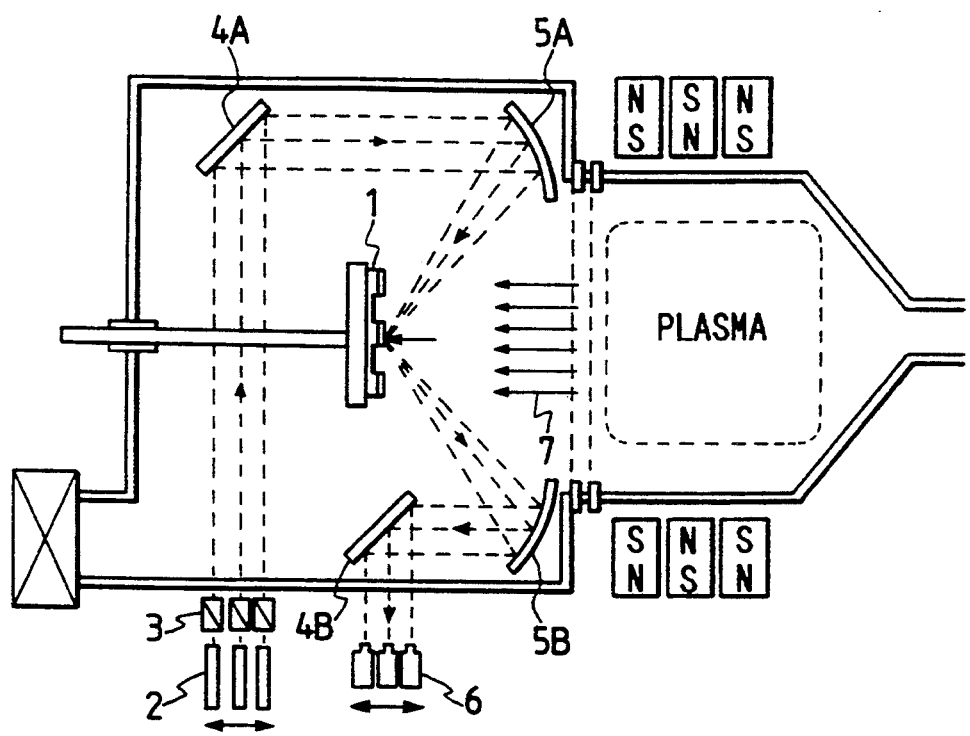
FIG. 5 shows a thickness/depth measuring apparatus according to the present invention.

FIG. 5 shows an arrangement for measuring the depth of a groove formed in the surface of a lithium niobate substrate or workpiece 1 and the thickness of a photoresist film formed in a lattice pattern over the surface of the workpiece 1 using a lithium niobate substrate during an ion milling process using ion beams 7 provided from an ion beam source generating a plasma. A coherent light beam of 632.8 nm in wavelength emitted by a He—Ne laser 2 as a light emitting element is polarized to provide a p-polarized light beam by a Glan-Taylor prism 3. The p-polarized light beam 3 reflected by a mirror 4A and a nonaxial parabolic mirror 5A falls obliquely on the workpiece 1 disposed at the focal point of the nonaxial parabolic mirror 5A. The incident angle of the light beam on the workpiece 1 is dependent on the position at which the light beam falls on the nonaxial parabolic mirror 5A. The distance of the He—Ne laser 2 from the optical axis is varied in the range of 75 mm to 126 mm to vary the incident angle in the range of 45° C. to 70° C. The reflected light beam reflected and diffracted by the workpiece 1 is reflected by a nonaxial parabolic mirror 5B and a mirror 4B and falls on a detector 6. The nonaxial parabolic mirrors 5A and 5B are disposed symmetrically with respect to the workpiece 1.

Figure 6:
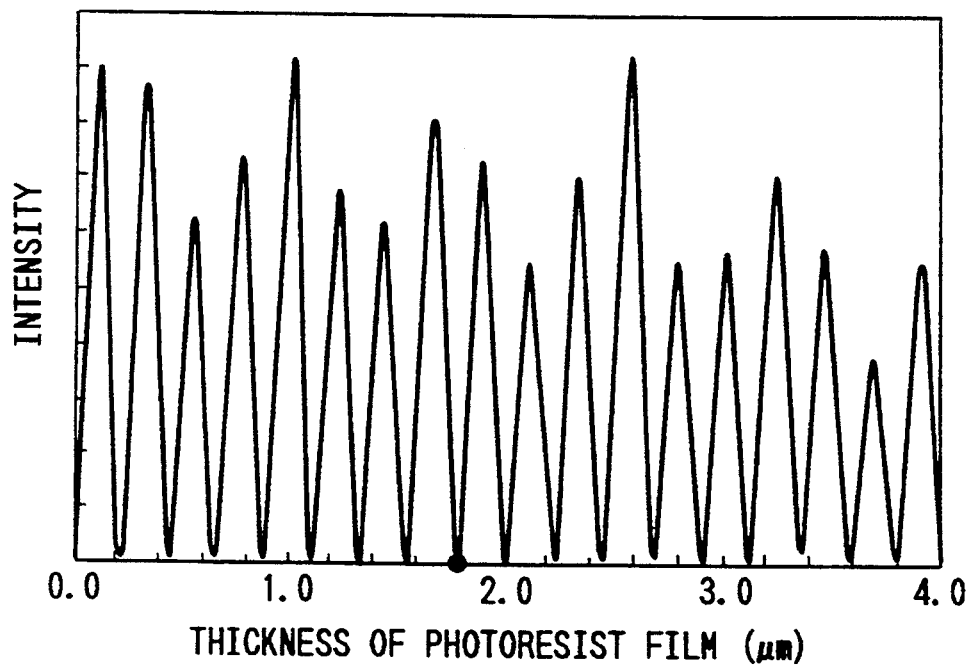
FIG. 6 shows the variation of the intensity of diffracted light with the thickness of a masking film.
Figure 7:
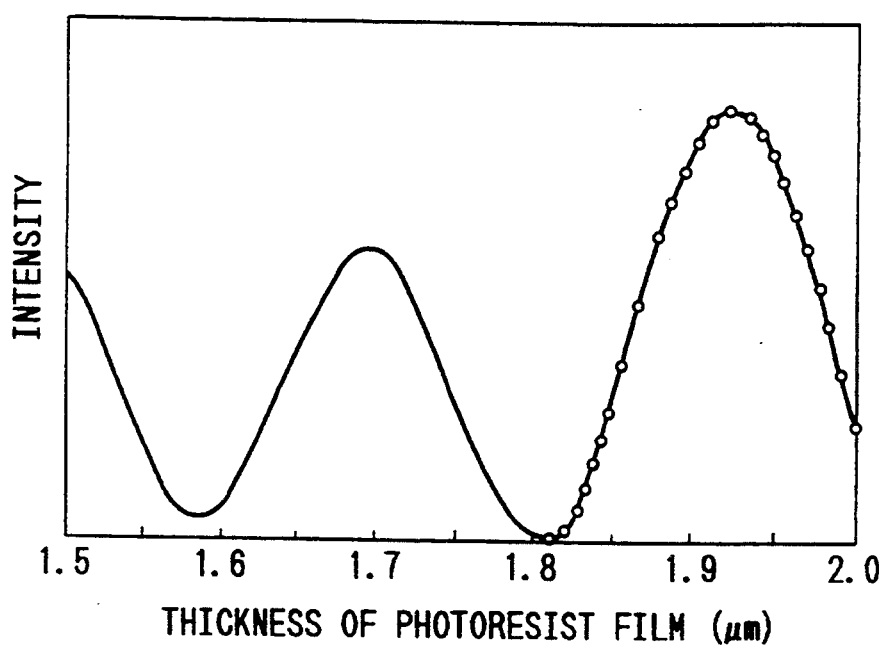
FIG. 7 shows the variation of the intensity of diffracted light with the thickness of a masking film for an expanded portion of FIG. 6.

FIGS. 6 and 7 shows the relation between the thickness of the photoresist film and the intensity of the diffracted light when the incident angle of the p-polarized light beam is a Brewster angle of 65.58° C. corresponding to the refractive index 2.2027 of the lithium niobate for an extraordinary ray. The thickness of the photoresist film can be determined on the basis of the period of its repetition by continuously measuring the intensity of the diffracted light once every minute during the ion milling processing of the workpiece 1. Since the ion milling rate of the photoresist film is about 0.5 μm per hour, the difference of thickness of the photoresist film between each measurement point is about 0.008 μm. During the ion milling processing, the series of measured intensity changes as shown in FIG. 7 which is an expanded view of a portion of FIG. 6. From FIGS. 6 and 7, it is known that the tenth minimum intensity of the diffracted light corresponds to a thickness of 1.81 μm of the photoresist film when the initial thickness of the masking film is 4.0 μm.

Figure 8:
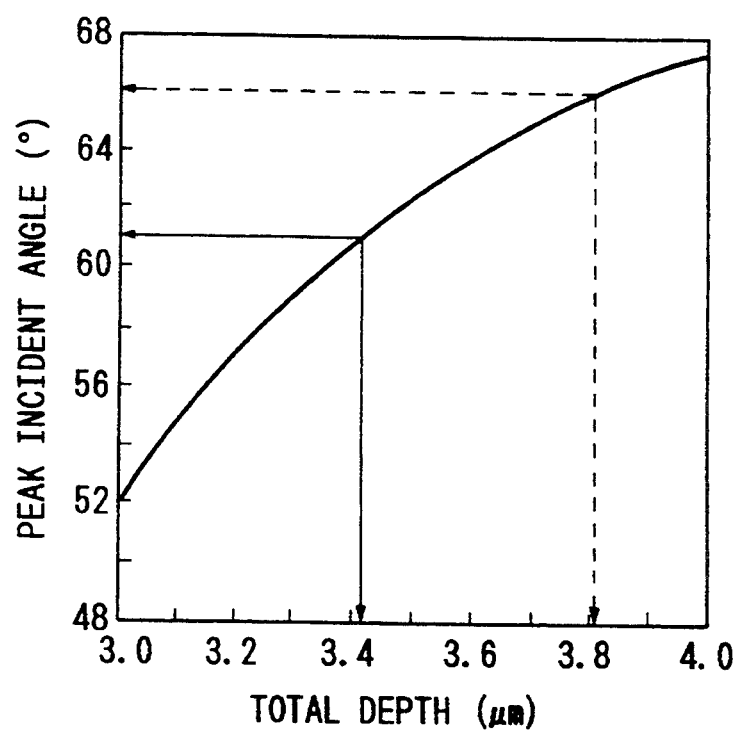
FIG. 8 shows the relation between peak incident angle and total depth.

The relation shown in FIG. 8 is determined by using an s-polarized light beam in the arrangement of FIG. 5 after the thickness of the photoresist film has been thus determined, and adjusting the incident angle to find a peak incident angle at which the intensity of the diffracted light reaches a maximum or minimum. Soon after the thickness of the photoresist film has been determined, the intensity of the diffracted s-polarized light beam is measured with the incident angle of the s-polarized light beam being varied from 48° C. to 68° C. in increments of 0.1° C. A shutter is arranged between the ion beam source and the workpiece 1 and the shutter should be closed during this measurement because it takes 0.5 seconds to change the incident angle 0.1° C. and it thus takes 100 seconds to change the incident angle from 48° C. to 68° C. Since the peak incident angle at which the intensity of the diffracted light reaches a maximum or minimum is dependent on the total depth, i.e., the sum of the thickness of the photoresist film and the depth of the groove, for example, the total depth is 3.42 μm when the peak incident angle is 61° C. and the depth of the groove is 1.61 μm, which is the remainder of subtraction of the thickness of the photoresist film from the total depth.

EXAMPLE 2

Example 2 will be described as applied to determining the total depth during an ion milling process for ion-milling an alumina titanium carbide (abbreviated to "AlTiC") substrate as the workpiece 1 coated with a carbon mask formed in a pattern. Similarly to the measuring operation in Example 1 with reference to FIG. 5, an s-polarized light beam of 785 nm in wavelength emitted by a semiconductor laser is projected on the AlTiC substrate and the incident angle of the s-polarized light beam on the AlTiC substrate is adjusted to find a peak incident angle at which the intensity of the reflected, diffracted light reaches a peak. FIG. 8 shows the relation between the peak incident angle and the total depth thus determined. For example, from FIG. 8, the total depth is 3.81 μm when the peak incident angle is 66° C. Since the carbon mask is opaque, the thickness of the carbon mask cannot be measured. However, the ratio between carbon processing speed and AlTiC processing speed, i.e., the selection ratio, is a known value of 1.5 and the ratio is stable. Accordingly, the depth of the groove can be calculated on the basis of the initial thickness of the carbon mask and the selection ratio by using the following expression.

$$\text{(Depth of groove)} = \frac{\text{(Thickness of masking film before processing)} - \text{(Total depth)}}{\text{(Selection ratio)} - 1} \quad (22)$$

When the initial thickness of the carbon mask is 10 μm and the selection ratio is 1.5, the depth of the groove is 12.38 μm.

As described, the thickness of the masking film is determined by projecting a p-polarized light beam at an incident angle corresponding to the Brewster angle of the substrate or workpiece, the total depth is determined on the basis of the peak incident angle at which the intensity of the diffracted light reaches a peak by adjusting the incident angle, and the depth of the groove is determined by subtracting the thickness of the masking film from the total depth. Thus, the thickness/depth measuring apparatus is capable of accurately measuring the depth of the groove even if the substrate is coated with a pattern of the masking film, such as a resist film. The apparatus enables the determination of the thickness of the masking film without being affected by the groove, and the determination of the total depth without being affected by the thickness of the masking film. Accordingly, even if the thickness of the masking film and the depth of the groove are approximately equal to each other, the thickness of the masking film and the depth of the groove can be determined with a high accuracy.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A thickness/depth measuring apparatus for measuring the thickness of a film forming a lattice-shaped mask and the depth of a groove formed on a workpiece during processing of the workpiece, the thickness/depth measuring apparatus comprising:
   means for irradiating the workpiece with a coherent light beam;
   polarizing means for controlling the direction of linear polarization of the coherent light beam irradiated onto the workpiece;
   incident angle adjusting means for adjusting the incident angle of the coherent light beam irradiated onto the workpiece in a predetermined angular range;
   means for receiving and detecting reflected light reflected by the workpiece at different irradiated incident angles and including higher-order diffracted light; and
   arithmetic means for calculating the thickness of the film and the depth of the groove in accordance with the intensity of the diffracted light detected by the light receiving means.

2. A thickness/depth measuring apparatus according to claim 1, wherein the incident angle adjusting means adjusts the incident angle to determine the peak incident angle at which the intensity of the diffracted light is one of a maximum and minimum, and the arithmetic means effects calculation in accordance with the detected intensity at the peak incident angle.

3. A thickness/depth measuring apparatus according to claim 1, wherein the predetermined angular range includes the Brewster angle of the workpiece.

4. A thickness/depth measuring apparatus according to claim 3, wherein the polarizing means controls the direction of linear polarization of the coherent light beam to be p-polarized light irradiated on the workpiece at the Brewster angle and the receiving means includes means for measuring the period of repetition of the intensity of the diffracted light, and the arithmetic means calculates the thickness of the film forming the mask in accordance therewith.

5. A thickness/depth measuring apparatus according to claim 1, wherein the arithmetic means enables at least one of determination of the thickness of the film forming a mask and the depth of the groove and the sum of the thickness of the film forming the mask and the depth of the groove in accordance with a manipulated angle determined by adjusting the incident angle by the incident angle adjusting means so that the intensity of the reflected, diffracted light from the workpiece attains one of a maximum and minimum.

6. A thickness/depth measuring apparatus according to claim 1, wherein the polarizing means enables control of the direction of linear polarization of the coherent light beam so as to provide a p-polarized light beam and an s-polarized light beam.

7. A thickness/depth measuring apparatus according to claim 6, wherein the incident angle adjusting means adjusts the incident angle to be a Brewster angle of the workpiece for the p-polarized light beam.

8. A thickness/depth measuring apparatus according to claim 7, wherein the incident angle adjusting means adjusts the incident angle so that the intensity of the reflected, diffracted light reaches one of a maximum and minimum for the s-polarized light beam.

9. A thickness/depth measuring apparatus according to claim 1, wherein the incident angle adjusting means includes a parabolic mirror and a rectilinear displacement mechanism for displacing the irradiation, means for providing the coherent light beam, and means for calculating the incident angle on the basis of the rectilinear displacement.

10. A thickness/depth measuring apparatus according to claim 9, wherein the irradiation means includes a laser beam source.

11. A thickness/depth measuring method for measuring the thickness of a film forming a lattice-shaped mask and the depth of a groove formed on a workpiece during processing of the workpiece, comprising the steps of:
    irradiating the workpiece with a coherent light beam;
    controlling the direction of linear polarization of the coherent light beam irradiated onto the workpiece;
    adjusting an incident angle of the coherent light beam irradiated onto the workpiece in a predetermined angular range;
    receiving reflected light reflected by the workpiece at different irradiated incident angles and including higher-order diffracted light; and
    calculating the thickness of the film and the depth of the groove in accordance with the intensity of the diffracted light detected.

12. A thickness/depth measuring method according to claim 11, wherein the step of controlling the direction of linear polarization of the coherent light beam includes controlling the direction of linear polarization so as to provide a p-polarized light beam irradiated onto the workpiece, and the step of adjusting the incident angle includes adjusting the incident angle to be a Brewster angle of the workpiece when the workpiece is irradiated with the p-polarized light beam, and the step of calculating the thickness of the film includes comparing the detected intensity and diffraction angles with previously determined data between the intensity of reflected, diffracted light beam and diffraction angles.

13. A thickness/depth measuring apparatus according to claim 12, wherein the step of controlling the direction of linear polarization of the coherent light beam includes, after calculating the thickness of the film, controlling the direction of linear polarization of the coherent light beam so as to provide an s-polarized light beam irradiated onto the workpiece, the step of adjusting the incident angle includes adjusting the incident angle of the irradiated s-polarized light beam onto the workpiece to an adjusted incident angle at which the intensity of the diffracted light reaches one of a maximum and a minimum, and the step of calculating includes determining the sum of the thickness of the film and the depth of the groove by comparison with the previously determined data in dependence on the adjusted incident angle, and subtracting the thickness of the determined thickness of the film from the determined total depth to determine the depth of the groove.

14. A thickness/depth measuring apparatus according to claim 13, wherein the workpiece is processed by a dry etching process.

15. A thickness/depth measuring method according to claim 14, wherein the dry etching process includes ion beam processing of the workpiece.

* * * * *